(12) United States Patent
Yang et al.

(10) Patent No.: US 7,547,740 B2
(45) Date of Patent: Jun. 16, 2009

(54) EMULSION POLYMER BLEND COATING COMPOSITIONS AND METHODS FOR INCREASING CHALKY SUBSTRATE ADHESION

(75) Inventors: Yong Yang, Hillsborough, NJ (US); Yakov Freidzon, Bridgewater, NJ (US); Robert Sheerin, North Caldwell, NJ (US); Luz Clarena Shavel, Budd Lake, NJ (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 12/052,808

(22) Filed: Mar. 21, 2008

(65) Prior Publication Data

US 2008/0200614 A1    Aug. 21, 2008

Related U.S. Application Data

(63) Continuation-in-part of application No. 11/384,183, filed on Mar. 17, 2006, now abandoned.

(51) Int. Cl.
C08J 3/03 (2006.01)
C09D 5/02 (2006.01)
C08L 33/00 (2006.01)
C08F 2/16 (2006.01)
C08F 2/22 (2006.01)
C08L 29/00 (2006.01)
C08L 35/00 (2006.01)
C08L 83/12 (2006.01)

(52) U.S. Cl. ............... 524/501; 524/523; 524/521; 524/800; 524/818; 524/823; 524/837

(58) Field of Classification Search ........... 524/515, 524/523, 502, 501, 521, 800, 818, 823, 837
See application file for complete search history.

(56) References Cited

U.S. PATENT DOCUMENTS 4,749,727 A * 6/1988 Tsuchiya ............... 522/170
2004/0010071 A1 * 1/2004 Gebhart et al. ............ 524/523

FOREIGN PATENT DOCUMENTS

WO    WO 9519997 A1 *    7/1995

* cited by examiner

Primary Examiner—Vasu Jagannathan
Assistant Examiner—Karuna P Reddy
(74) Attorney, Agent, or Firm—The H.T. Than Law Group

(57) ABSTRACT

The present invention relates to a coating composition containing a polymer blend dispersion including: a first polymer having a relatively low molecular weight and a relatively low glass transition temperature and comprising a self-crosslinking monomer; and a second polymer having a relatively high molecular weight and a relatively high glass transition temperature. Latex paint compositions and architectural coatings containing the coating composition according to the invention are also described herein, as well as substrates coated therewith.

35 Claims, 1 Drawing Sheet
(1 of 1 Drawing Sheet(s) Filed in Color)

EMULSION POLYMER BLEND COATING COMPOSITIONS AND METHODS FOR INCREASING CHALKY SUBSTRATE ADHESION

CROSS-REFERENCE TO RELATED APPLICATION

The present application is a continuation-in-part of co-pending patent application Ser. No. 11/384,183, filed on Mar. 17, 2006. The parent application and its prosecution are incorporated by reference herewith in its entirety.

FIELD OF THE INVENTION

The present invention relates to a coating composition containing a polymer blend dispersion including a first polymer having a relatively low molecular weight and a relatively low glass transition temperature, and a second polymer having a relatively high molecular weight and a relatively high glass transition temperature. The emulsion coating composition according to the invention can advantageously be used in paint compositions and architectural coating applications.

BACKGROUND OF THE INVENTION

Good adhesion properties, particularly to chalky substrates, are important to coatings such as paints and architectural coatings. One conventional method for improving the chalk adhesion properties of a coating composition is to add an alkyd resin to the conventional coating composition. However, alkyd resins produce premature yellowing, rendering the coatings undesirable in certain circumstances.

Another method for improving the chalk adhesion properties is to synthesize a polymer blend in a sequential polymerization. Examples of acrylic-based polymer blends made by sequential polymerization processes can be found in U.S. Pat. Nos. 5,990,228 and 6,710,112 B1.

The '228 patent discloses aqueous coating compositions containing at least two polymer components which supposedly provide adhesion and improved durability, as measured in dried coatings made from the aqueous compositions by improved gloss retention or dirt pickup resistance. Specifically, in Comparative Example 1 of the '228 patent, this patent discloses the use of a pre-polymerized latex core of 60 nm particulate poly(butyl acrylate-co-methyl methacrylate-co-methacrylic acid), upon which was further polymerized two layers of poly(butyl acrylate-co-methyl methacrylate-co-acrylic acid) of the same composition. The at least two polymer components are synthesized as core-shell polymers by a sequential polymerization process.

The '112 patent discloses aqueous polymer dispersions having two polymer phases that have different glass transition temperatures but that are formed by a sequential polymerization process. In addition, the molecular weights of the two polymer phases are different, due to the addition at some point during the sequential polymerization of a chain transfer reagent.

Other publications disclose alternatives to alkyd resin modification in coating compositions.

For example, U.S. Patent Application Publication No. 2004/0161542 A1 and U.S. Pat. No. 6,630,533 both disclose compositions containing at least one fatty acid ester. In the '542 publication, the fatty acid ester is unsaturated. In the '533 patent, the fatty acid ester comprises a $C_{12}$ to $C_{40}$ alkyl (meth)acrylate.

U.S. Pat. No. 5,376,704 discloses aqueous coating compositions containing a neutralized half-ester product of an acrylic polymer containing at least two reactive anhydride groups that is crosslinked with an epoxy crosslinker. The molecular weights of both these components are less than 100,000 Daltons.

U.S. Patent Application Publication No. 2004/0010091 A1 discloses two component coating compositions that cure under ambient conditions. The coating composition of the '091 publication contains crosslinkable and crosslinking components, with both components having molecular weights under 100,000 Daltons.

U.S. Patent Application Publication No. 2004/0010071 A1 discloses an aqueous polymer blend composition containing soft and hard polymer particles. The hard polymer particles have a glass transition temperature greater than 25° C., while the soft polymer particles have a glass transition temperature less than or equal to 25° C. In addition, the hard polymer particles constitute from 2-30 wt % of the composition, while the soft polymer particles constitute from 70-98 wt % of the composition.

U.S. Patent Application Publication No. 2005/0009954 A1 discloses aqueous polymer compositions containing hard polymers and soft polymers, with at least the hard polymers include phosphorus-containing and/or polyacid-containing pendant groups. The hard polymers have a glass transition temperature of at least 20° C., while the soft polymers have a glass transition temperature of from −20° C. to 5° C. In addition, the hard polymers constitute from 2-40 wt % of the composition, while the soft polymer particles constitute from 60-98 wt % of the composition.

In linear polymerization, there are several ways to measure average molecular weight, including weight average molecular weight (Mw), and number average molecular weight (Mn). The formulas for these average molecular weights are as follows:

$$\overline{M}_w = \frac{\sum_i N_i M_i^2}{\sum_i N_i M_i}$$

and $$\overline{M}_n = \frac{\sum_i N_i M_i}{\sum_i N_i},$$

where $N_i$ is the number of molecules of molecular weight $M_i$. Other average molecular weights include viscosity average molecular weight (Mv) and Z average molecular weight (Mz). During polymerization, the individual polymer chains do not have the same degree of polymerization, and therefore the weight of the individual molecules always has a distribution around an average value. See Textbook of Polymer Science, by Fred W. BillMeyer, Jr., (1984) at pp. 189 and 199.

The ratio of these two average molecular weights is the polydispersity index (PDI):

$$PDI = M_w/M_n.$$

Mw is more sensitive to the presence of high molecular weight molecules and Mn is more sensitive to molecules with lower molecular weight. Mw is always greater than Mn, except for a theoretical monodisperse system. Id. at p. 200. Hence PDI≧1.0.

PDI is an indication of the distribution of individual molecular masses in a polymer system. Higher PDI indicates higher variation of molecular masses and lower PDI indicates that the molecular masses are fairly uniform.

The latex polymer blend disclosed in the prior art reference US 2004/0010071 or U.S. Pat. No. 6,930,141 to Gebhart et al is dominated by soft or low Tg polymer particles (70%-99.7%) and has only a minor amount of hard or high Tg polymer particles. (See Abstract). The weight average molecular weight (Mw) of the soft polymer ranges from 75,000 to 2,000,000. Since the molecular weight of the soft polymer is high and the relative amount of the hard polymer is low, inter alia, the latex composition disclosed in Gebhart has poor adhesion to chalky substrate typically found outdoors.

There remains a need in the art for a polymer blend of soft and hard latex polymers that exhibits improved adhesion to chalky substrate.

BRIEF SUMMARY OF THE INVENTION

The present invention involves a latex composition comprising a polymer blend of a first polymer and a second polymer, wherein: (a) the first polymer is made from first constituent monomers, has a number average molecular weight less than about 40,000 Daltons and a polydispersity index of less than about 4.5, has a glass transition temperature from about −20° C. to about 60° C., and comprises an amount of a self-crosslinking monomer; (b) the second polymer is made from second constituent monomers, has a number average molecular weight greater than about 100,000 Daltons, and has a glass transition temperature from about −20° C. to about 60° C.; (c) the glass transition temperature of the second polymer is at least 10° C. higher than the glass transition temperature of the first polymer; and (d) the relative proportion of the first polymer to the second polymer is from about 1:4 to 4:3 by weight.

Alternatively, the first polymer has a weight average molecular weight of about 70,000 Daltons or less.

The present invention also describes coating compositions containing the latex composition according to the invention, as well as coatings made therefrom and coated substrates on which the coating compositions containing the latex composition according to the invention are disposed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the accompanying drawings, which form a part of the specification and are to be read in conjunction therewith and in which like reference numerals are used to indicate like parts in the various views.

DETAILED DESCRIPTION OF THE INVENTION

Figure 1:
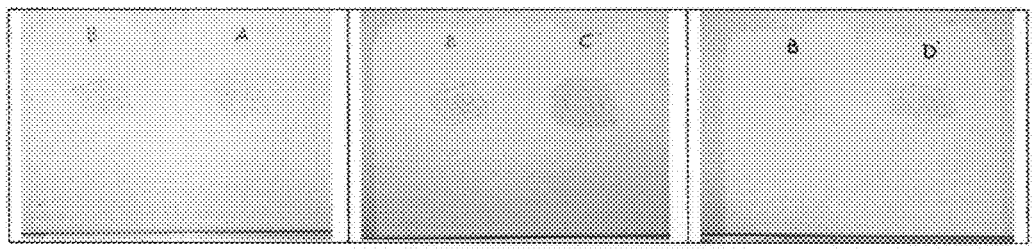
FIG. 1 is a color photograph depicting the chalk adhesion results for inventive and comparative samples.

One aspect of the present invention relates to a latex emulsion composition containing a polymer blend of: (i) a first polymer having a relatively low molecular weight and a relatively low glass transition temperature; and (ii) a second polymer having a relatively high molecular weight and a relatively high glass transition temperature. Advantageously, the first polymer is polymerized from constituent monomers that include a self-crosslinking monomer.

As used herein, the phrase "relatively low molecular weight" means a number average molecular weight of less than about 40,000 Daltons or a weight average molecular weight of less than about 70,000 Daltons. Preferably, the relatively low molecular weight has a polydispersity index of less than about 4.5. Also as used herein, the phrase "relatively high molecular weight" means a number average molecular weight of greater than about 100,000 Daltons, preferably greater than about 200,000 Daltons or a weight average molecular weight of greater than about 200,000 Daltons.

One of the benefits of relatively low molecular weight chains in coating compositions containing the latex polymer blends according to the invention can be improved substrate adhesion, whereas one of the benefits of relatively high molecular weight chains in the latex polymer blends according to the invention can be increased physical/mechanical strength. Combining these benefits by creating a coating composition containing a polymer blend having both relatively high molecular weight and relatively low molecular weight polymer chains is therefore desirable.

When conventional paint compositions containing relatively high molecular weight acrylic-based latexes are applied to chalky substrates, for example, they can tend to exhibit poor adhesion to the chalky surface. In some cases, alkyd resins are combined with these poorly-adhering acrylic-based latex-containing paint compositions to improve the wet and/or dry adhesion properties. Alkyd resins, however, may negatively affect certain qualities of the paint compositions, including, but not limited to, causing loss of gloss, causing yellowing, causing color fading, causing chalkiness, causing brittleness, hindering clean-up, decreasing emulsion stability (thus increasing the need for added surfactant), increasing sensitivity to water, and the like, and combinations thereof.

Another method for improving adhesion of paint compositions applied on chalky substrates and for reducing or eliminating the need for incorporating alkyd resins with relatively high molecular weight acrylic-based latexes includes the formation of polymers containing multimodal molecular weight distributions. Multimodal molecular weight distributions in polymer blends are typically attained by sequentially polymerizing monomers and by using a molecular weight control agent, such as a chain transfer agent, at some point during the polymerization process. See, e.g., commonly-owned, co-pending U.S. patent application Ser. No. 11/323,621, filed Dec. 30, 2005, and entitled "Emulsion Polymers Having Multimodal Molecular Weight Distributions". Such sequential polymerization processes have been described as forming core-shell type polymers, such as those disclosed in U.S. Pat. Nos. 5,990,228 and 6,710,112 B1, for example. However, because of the nature of the sequential polymerization process, the different molecular weights are typically attained for identical polymers (i.e., containing the same constituent monomer feeds), or for polymers that have relatively similar constituent monomer feeds.

It is believed that the use of polymer blend compositions according to the invention containing both low molecular weight and high molecular weight chains in paint compositions applied on chalky substrates can advantageously reduce or eliminate the need for incorporating alkyd resins with high molecular weight latex polymers, and can be an alternative to sequentially polymerized and/or core-shell type polymers with multimodal molecular weight distributions. Without being bound by theory, it is believed that the presence of the first polymer in the blend having the lower molecular weight can sufficiently improve the adhesion of paint compositions containing them to chalky substrates. Nevertheless, because uniformly lower molecular weight polymer particles can tend to compromise the physical and mechanical properties of the paint compositions and/or the surfaces of the chalky substrates coated therewith, it is also believed that a combination of low and high molecular weight polymers can simultaneously result in acceptable adhesion and acceptable physical/mechanical properties.

In one embodiment, the number average molecular weight of the first polymer is less than about 40,000 Daltons, and the first polymer has a polydispersity index of less than about 4.5. The number average molecular weight of the first polymer can be less than about 37,500 Daltons, preferably less than about 35,000 Daltons, more preferably less than about 32,500 Daltons, and more preferably less than about 30,000 Daltons. This number average molecular weight can be less than about 27,500 Daltons, less than about 25,000 Daltons, less than about 22,500 Daltons, or less than about 20,000 Daltons. The first polymer preferably a number average molecular weight of greater than about 7,000 Daltons, greater than about 10,000 Daltons or greater than about 12,000 Daltons. The polydispersity index of the first polymer is preferably less than about 4.0, more preferably less than about 3.5, and more preferably less than about 3.0.

The weight average molecular weight of the first polymer is preferably less than about 70,000 Daltons and with the polydispersity index discussed in the preceding paragraph or with any polydispersity index. The weight average molecular weight of the first polymer can be less than about 65,000 Daltons, less than about 60,000 Daltons, less than about 55,000 Daltons, less than about 50,000 Daltons, less than about 45,000 Daltons, less than about 40,000 Daltons, less than about 35,000 Daltons, or less than about 30,000 Daltons.

The second polymer has a number average molecular weight greater than 80,000 Daltons, or a weight average molecular weight greater than 200,000 Daltons. The number average molecular weight of the second polymer can be from 80,000 to 1,000,000 Daltons, preferably from 100,000 to 500,000 Dalton; or the weight average molecular weight of the second polymer is from 200,000 to 2,000,000 Daltons, preferably from 300,000 to 1,000,000 Daltons.

The glass transition temperatures of both polymers in the blend are typically above about −30° C. In a preferred embodiment, the $T_g$ values of both polymers in the blend can fall within the range from about −20° C. to about 60° C., preferably from about −15° C. to about 50° C. In one embodiment, the $T_g$ of the first polymer can be less than about 25° C. In a preferred embodiment, the $T_g$ of the first polymer can be from about −15° C. to about 40° C., preferably from about −10° C. to about 30° C., for example from about −5° C. to about 20° C. or from about 0° C. to about 10° C. In another embodiment, the $T_g$ of the second polymer can be less than about 25° C. In another preferred embodiment, the $T_g$ of the second polymer can be from about −10° C. to about 45° C., preferably from about −5° C. to about 35° C., for example from about 0° C. to about 25° C. or from about 5° C. to about 25° C. In another preferred embodiment, the $T_g$ of the second polymer can be at least about 0° C. or at least about 80° C., preferably from 10° C. to 60° C. and more preferably from 20° C. to 40° C. Alternatively, the $T_g$ of the second polymer is about 10° C., about 15° C., or about 20° C. greater than the $T_g$ of the first polymer.

In one embodiment, the $T_g$ values for each of the polymers of the blend can preferably be measured using conventional tools and techniques known to those of skill in the art, e.g., differential scanning calorimetry (DSC), dynamic mechanical thermal analysis (DMTA), or the like, or a combination thereof. In another embodiment, the $T_g$ values for each of the polymers of the blend can be completely calculated by applying Fox's law to known $T_g$ values, e.g., from any edition of the *Polymer Handbook* such as the 3$^{rd}$ ed. (1989), of the homopolymers corresponding to each of the monomers used and their respective weight ratios. For descriptions of this latter method, see, e.g., U.S. Pat. No. 6,723,779 and/or International Publication No. WO 94/04581, the disclosures of both of which are incorporated herein by reference in their entireties. Preferably, Fox's law is used.

In a preferred embodiment, the relative proportion of the first polymer to the second polymer in the polymer blend according to the invention can be from about 1:4 to 2:1 by weight, for example from about 1:4 to 4:3 by weight, preferably from about 1:3 to about 5:4 by weight, more preferably from about 1:3 to about 6:5 by weight, most preferably from about 3:7 to about 1:1 by weight.

In the polymer blend of the present invention, both polymers can be made from a mixture of constituent monomers containing (a) diluent monomers having either no functional groups or functional groups that are relatively unreactive and (b) functional (also called crosslinkable) monomers having functional groups that are relatively reactive and that are capable of crosslinking the polymer with a crosslinking agent. The functional monomers can be useful for later coalescence, and optionally crosslinking, if desired, of one or both of the polymers in the blend. As a common functional group is a carboxylic acid group, the content of the functional monomers that are not also self-crosslinking herein can be described as acid monomer content.

In one embodiment, the first polymer in the polymer blend can have a self-crosslinking monomer content from about 0.1% to about 5% by weight, preferably from about 0.2% to about 4% by weight, for example from about 0.4% to about 3% by weight, from about 0.2% to about 1.5% by weight, from about 0.5% to about 4% by weight, or from about 0.5% to about 2% by weight.

In one embodiment, both of the polymers in the polymer blend can have an average acid monomer content of less than about 10% by weight, preferably less than about 7%, more preferably from about 0.1% to about 5%, for example from about 0.5% to about 3%. Although the acid content is described herein in terms of weight percent of acid monomer, acid content can be quantified in many ways, e.g., acid number.

Another group of monomers also contain reactive functional groups, but those groups are capable of crosslinking the polymer without the presence of a crosslinking agent in the composition; such monomers are collectively termed "crosslinking monomers" herein and include, but are not limited to, "self-crosslinking" monomers, which require no external crosslinking agent to form crosslinks, "oxidatively crosslinking" monomers, which utilize atmospheric oxygen but need no crosslinking agent in their composition to form oxidative crosslinks, and the like.

Many different functional groups may be suitable as pendant groups on the constituent monomers forming the polymers in the blend according to the invention. Although the polymers in the blend according to the invention can be described in terms of their acid content, it should be understood that the term "acid content" should include not merely the content of carboxylic acid-containing monomers, but the combined content of any functional/crosslinkable (but not crosslinking) monomers. Further, as used herein, the terms "polymer" and "polymers" are used to refer to oligomers, homopolymers, random copolymers, statistical copolymers, alternating copolymers, periodic copolymer, bipolymers, terpolymers, quaterpolymers, other forms of copolymers, adducts thereof, substituted derivatives thereof, and combinations or blends thereof. Such polymers can be linear, branched, hyper-branched, crosslinked, block, di-block, multi-block, graft, isotactic, syndiotactic, stereoregular, atactic, gradient, multi-arm star, comb, dendritic, and/or any combination thereof.

Examples of polymer repeat units having functional groups can include, but are not limited to, acrylic acid, ionic acrylate salts, alkacrylic acids, ionic alkacrylate salts, haloacrylic acids, ionic haloacrylate salts, acetoacetoxyalkyl acrylates, acetoacetoxyalkyl alkacrylates, polymerizable anhydrides such as maleic anhydride, acrylamide, alkacrylamides, monoalkyl acrylamides, monoalkyl alkacrylamides, alkacrylamidoalkyl ethyleneureas such as those sold under the tradename Sipomer™ WAM, alkenyloxyamidoalkyl ethyleneureas such as those sold under the tradename Sipomer™ WAM, vinyl dicarboxylic organic acids (e.g., itaconic acid, glutaconic acid, maleic acid, angelic acid, fumaric acid, tiglic acid, and the like), monoalkyl esters of vinyl dicarboxylic organic acids (e.g., methyl maleate, ethyl fumarate, and the like), monoisopropenyl esters of saturated, vinyl dicarboxylic organic acids, monoalkoxydialkyl vinyl silanes, dialkoxyalkyl vinyl silanes, trialkoxy vinyl silanes, and the like, and copolymers and combinations thereof.

As used herein, the prefix "alk" before an ethylenically unsaturated monomer should be understood to indicate a $C_1$-$C_6$ hydrocarbon side group attached to either carbon of the olefinic pendant group, though it usually refers to a group attached to the same carbon as the olefinic pendant group. For example, the most basic alkacrylic acid is methacrylic acid. However, if the "alk" group is on the vinyl carbon not containing the pendant carboxylic acid, then a methacrylic acid becomes crotonic acid, which is contemplated as an alkacrylic acid, as defined herein. Another example includes tiglic acid (i.e., 2-butene-2-carboxylic acid), which is an alkacrylic acid containing two "alk" groups, with one methyl group attached to each vinyl carbon. As used herein, the term "alkyl" should be understood to mean an aliphatic $C_1$-$C_{18}$ hydrocarbon moiety. For instance, the monomer ethyl methacrylate has a methyl group attached as an ester to the pendant carboxylate group and an ethyl group attached to the same carbon of the vinyl moiety as the pendant carboxylate (i.e., $CH_2$=$C(CH_2CH_3)$—$C(=O)O(CH_3)$). As used herein, the term "alkenyl" should be understood to mean a $C_2$-$C_{18}$ hydrocarbon moiety having a single double bond, preferably a terminal double bond. As used herein, the term "alkoxy" group should be understood to mean a group having a $C_1$-$C_{12}$ hydrocarbon or oxyhydrocarbon (i.e., containing hydrogen, carbon, and oxygen atoms) moiety attached to a terminal oxygen atom.

In the embodiments where the polymer repeat units include ionic salts, their counterions can include, but are not limited to, sodium, potassium, lithium, copper, silver, ammonium, tetraalkyl ammonium, alkyl pyridinium ions such as N-methylpyridinium, tetraalkyl phosphonium ions, tetraaryl phosphonium ions, aralkyl phosphonium ions such as methyltriphenylphosphonium and methyltriphenoxyphosphonium, trialkylsulfonium ions such as trimethylsulfonium, aralkyl sulfonium ions, trialkylsulfoxonium ions such as trimethylsulfoxonium, aralkyl sulfoxonium ions, and the like, and combinations thereof. As used herein, the term "aryl" should be understood to mean an aromatic $C_6$-$C_{18}$ moiety, and the term "aralkyl" should be understood to mean a moiety that is partially aryl and partially alkyl.

In one embodiment, the constituent monomers of the first polymer, the constituent monomers of the second polymer, or both, can be substantially free from hydroxy-functional pendant groups such as, but not limited to, those in hydroxyalkyl acrylates, hydroxyalkyl alkacrylates, vinyl phenols, hydroxyalkyl vinyl benzenes, only partially esterified acrylate esters of alkylene glycols, only partially esterified acrylate esters of non-polymeric polyhydroxy compounds like glycerol, only partially esterified acrylate esters of polymeric polyhydroxy compounds, and the like. In another embodiment, the constituent monomers of the first polymer, the constituent monomers of the second polymer, or both, can be substantially free from conjugated diene monomers such as, but not limited to, butadienes, hexadienes, hexatrienes, octadienes, octatrienes, octatetrenes, as well as hydrocarbon analogs thereof, substituted halo- and/or cyano-derivatives thereof, and the like, and a combination thereof. In another embodiment, the constituent monomers of the first polymer, the constituent monomers of the second polymer, or both, can be substantially free from phosphorus-containing pendant groups, from polyacid-containing pendant groups, or both. As used herein, the terms "substantially no" and "substantially free from", referring to a component in a composition, mean that the composition comprises not more than about 1 wt %, preferably not more than about 0.5 wt %, more preferably not more than about 0.1 wt %, most preferably not more than about 0.02 wt %, or in some cases completely none (about 0%), of the component.

In addition to the monomers containing functional groups, both the polymers in the blend according to the invention can also comprise diluent monomers or repeat units that contain pendant groups that do not typically react with crosslinking agents. Examples of such diluent monomers can include, but are not limited to, alkyl acrylates, alkyl alkacrylates, alkyl esters of vinyl monocarboxylic organic acids other than acrylates and alkacrylates (e.g., ethyl tiglate, methyl crotonate, and the like), dialkyl esters of vinyl dicarboxylic acids, styrene, alkylstyrenes (e.g., α-ethylstyrene, α-methylstyrene, vinyl toluene, 2,4-dimethylstyrene, 4-t-butylstyrene, and the like), halostyrenes (e.g., α-bromostyrene, 2,6-dichlorostyrene, and the like), isopropenyl esters of saturated, monocarboxylic organic acids (e.g., isopropenyl acetate, isopropenyl isobutyrate, and the like), monoisopropenyl monoalkyl esters of saturated, dicarboxylic organic acids (e.g., isopropenyl alkyl oxalate, isopropenyl alkyl succinate, and the like), vinyl carboxylate alkyl ethers (e.g., vinyl acetate, vinyl propionate, vinyl butyrates, vinyl benzoates, halo-substituted versions thereof such as vinyl chloroacetate, and the like), vinyl alkyl ethers, acrylonitrile, alkacrylonitriles, dialkyl acrylamides, dialkyl alkacrylamides, allyl compounds (e.g., allyl chloride, allyl esters of saturated, monocarboxylic acids, allyl alkyl esters of saturated, dicarboxylic organic acids, and the like), and the like, and combinations thereof. Preferred diluent monomers include, but are not limited to, $C_1$-$C_8$ alkyl acrylates, $C_1$-$C_8$ alkyl $C_1$-$C_2$ alkacrylates, styrene, $C_1$-$C_4$ alkylstyrenes, vinyl acetate, and combinations thereof.

In one preferred embodiment, both the polymers in the blend according to the invention can be substantially acrylic. As used herein, the term "acrylic" refers to (co)polymer compositions made from monomers selected from the group consisting of alkyl acrylates, alkyl alkacrylates, acrylic acid, ionic acrylate salts, alkacrylic acids, ionic alkacrylate salts, acrylamide, alkacrylamides, monoalkyl acrylamides, monoalkyl alkacrylamides, acrylonitrile, alkacrylonitriles, substituted versions thereof (e.g., hydroxyalkyl acrylates, hydroxyalkyl alkacrylates, alkacrylamidoalkyl ethyleneureas, alkenyloxyamidoalkyl ethyleneureas, and the like), and the like, and combinations thereof. As used herein, the term "substantially," at least with regard to a component in a composition, means that the composition contains at least about 90% by weight of that component, preferably at least about 95% by weight of that component, more preferably at least about 97% by weight of that component, most preferably at least about 99% by weight of that component, in some cases at least about 99.9% by weight of that component, or completely comprises (about 100% by weight of) that component.

Acrylic latex copolymers containing acrylonitriles are known in the art to improve certain physical properties as compared to non-acrylonitrile-containing acrylics, but can significantly increase cost and can introduce undesirable environmental issues. Thus, in one embodiment, the diluent monomers specifically exclude acrylonitrile and alkacrylonitriles.

In a preferred embodiment, at least the second polymer (i.e., having a relatively high molecular weight and a relatively high $T_g$) of the polymer blend is substantially free from crosslinking monomers. In another preferred embodiment, the first polymer of the polymer blend can contain an amount of a self-crosslinking monomer but can be substantially free from oxidatively crosslinking monomers. In one embodiment, the polymer blend according to the invention can be used in architectural coatings and in paint formulations. In another embodiment, the polymer blend according to the invention can be combined with one or more pigments/colorants in hydrophobic latex applications.

Each of the polymers in the polymer blends according to the invention are typically polymerized in a latex system comprising water, surfactant, the desired monomer(s), an initiator, a polymer molecular weight control agent (in the case of the low molecular weight polymer), optionally an organic solvent, optionally a pH adjustor, optionally a chaser agent, optionally a coalescing agent, and optionally a preservative, which can be added at various times. The polymer blend according to the invention, in a preferred embodiment, specifically excludes two polymers that are sequentially polymerized; for instance, the polymer blend according to the invention may advantageously contain substantially no sequentially polymerized polymers.

Examples of surfactants useful in the compositions according to the invention can include, but are not limited to, nonionic and/or anionic surfactants such as ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, those compounds sold under the tradename Triton™ (e.g., QS series, CF series, X series, and the like), those compounds sold under the tradename Rhodapon™, those sold under the tradename Rhodapex™, those compounds sold under the tradename Rhodacal™, those compounds sold under the tradename Rhodafac™, and the like, and combinations thereof.

Examples of initiators and chaser solutions useful in the compositions according to the invention can include, but are not limited to, ammonium persulfate, sodium persulfate, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjustor, if desired to stabilize the emulsion.

Examples of pH adjustors useful in the compositions according to the invention can include, but are not limited to, ammonium hydroxide, sodium hydroxide, sodium carbonate, sodium bicarbonate, potassium hydroxide, potassium carbonate, potassium bicarbonate, ammonia, and the like, and combinations thereof. In certain cases, compounds that qualify as pH adjustors can be added for purposes other than adjusting pH, e.g., emulsion stabilization, and yet are still characterized herein as pH adjustors.

Polymer molecular weight control agents are designed to control (usually to limit) the molecular weight of a propagating polymer. While polymer molecular weight control agents can include things like radiation, they are typically molecules added to the polymerization mixture. Examples of polymer molecular weight control agents include, but are not limited to, chain transfer agents (CTAs), e.g., alkyl mercapto-esters such as isooctyl mercaptopropionate, alkyl mercaptans, and the like, and combinations thereof. Chain transfer agents typically operate as polymer molecular weight control agent molecules, for example, by catalytically or consumptively terminating a propagating polymer chain in a way that also initiates a newly propagating polymer chain. In this way, the amount of chain transfer agent(s) can be tailored to reduce the target polymer molecular weight in a set polymerization system, or alternately, in combination with calculation of the amount of initiator, can be calculated to target a particular average polymer molecular weight (e.g., within a given range) of a polymerization system.

Examples of biocides/preservatives useful in the compositions according to the invention can include, but are not limited to, hydroxy-functional aza-dioxabicyclo compounds such as those commercially available from ISP under the tradename Nuosept™ 95, those compounds sold under the tradename SKANE™, isothiazolones such as those sold under the tradename Kathon™, Polyphase™ additives from Troy Corp. and the like, and combinations thereof.

In another aspect of the invention, the latex polymer blend compositions can be included in a paint or other coating composition, which can advantageously be an emulsion further containing water, a coalescence solvent, a pH adjustor, a surfactant, a defoamer, a pigment, optionally but preferably a dispersant, optionally but preferably a rheology modifier, and optionally but preferably a biocide or preservative.

Examples of coalescence solvents and organic solvents useful in the compositions according to the invention can include, but are not limited to, 2-ethylhexyl ether of ethylene glycol (e.g., commercially available as Eastman™ EEH solvent), methyl carbitol, propylene glycol, ethylene glycol, those compounds sold under the tradename TEXANOL™, plasticizers such as dibutyl phthalate, and the like, and combinations thereof.

Examples of defoamers useful in the compositions according to the invention can include, but are not limited to, polysiloxane-polyether copolymers such as those sold by Tego under the tradename Foamex™, those sold under the tradename BYK™, those sold under the tradename Drewplus™, those sold under the tradename Surfynol™, and the like, and combinations thereof.

Examples of anticorrosive agents useful in the compositions according to the invention can include, but are not limited to, sodium nitrite and the like.

Examples of dispersants useful in the compositions according to the invention can include, but are not limited to, 2-amino-2-methyl-1-propanol, hydrophobic copolymers such as Tamol™ 165A, carboxylated polyelectrolyte salts such as Tamol™ 173A, and the like, and combinations thereof.

Examples of rheology modifiers useful in the compositions according to the invention can include, but are not limited to, those commercially available from Rohm & Haas under the tradename Acrysol™, such as RM-8W, RM-825, RM-5000, RM-2020 NPR and RM-825, Natrasol™ and Aquaflow™ from Aqualon Division of Hercules Inc. and UCAR Polyphobe™ from Dow.

While typically multiple pigments/colorants are present in end-use latexes that are to be used in paint or architectural coating applications, sometimes only a white pigment, such as a zinc oxide and/or a titanium oxide, is added in the early stages of the formation of the paint composition (e.g., in the base composition). In such a case, any other desired pigments/colorants of various colors (including more white pigment) can optionally be added at the later stages of, or after, formation of the paint composition. Examples of pigments/colorants useful according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention.

Additionally or alternately, extender pigments/colorants can be added, e.g., to the grind composition portion of the paint composition. Examples of extender pigments/colorants useful in the paint compositions according to the invention can include, but are not limited to, silica, silicates, carbonates such as calcium carbonates, and the like, and combinations thereof.

The coating compositions containing the blend of first and second polymers according to the invention can exhibit a wide range of viscosities, depending upon the application. In one embodiment, the viscosity of the polymer blend latex composition can be from about 65 to about 130 Krebunits (KU), preferably from about 70 to about 110 KU, more preferably from about 75 to about 105 KU. While coalescence, degradation, and other factors can cause the viscosity to increase over time, it is preferable that the viscosity not increase beyond about 130 KU, preferably not beyond about 120 KU, more preferably not beyond about 115 KU, and in some cases not beyond about 110 KU.

The polymer blends and/or latex coating compositions according to the invention can advantageously exhibit a pH from about 6 to about 10, although the pH needs only to be sufficient to maintain the stability of the particular blend and/or latex composition in combination with the surfactant(s) and other stabilizing components.

In most applications, the polymer blends and/or latex coating compositions according to the invention are typically applied as a coating on a substrate. The substrate may or may not depend upon the product in which acrylic latex according to the invention is used. For example, when the acrylic latex is used in a stain composition, the substrate can typically be wood or the like. Examples of substrates can include, but are not limited to: wood, including natural wood, compressed particulate wood, faux or artificial wood, wood composites, and the like, and combinations thereof; metals, including metal alloys, metal composites, coated metals, metallic surfaces, and the like, and combinations thereof; ceramics, including metal oxides, metal nitrides, metal oxynitrides, metal sulfides, metal carbides, and the like, and combinations thereof; transparent and/or translucent substrates such as glasses, polycarbonates, acrylics, styrenics, and the like, and combinations thereof, polymers; woven and/or non-woven fabrics; building materials such as dry wall, sheet rock, and the like, and combinations thereof; chalky substrates; and the like; and combinations thereof.

In one embodiment, a paint composition containing the polymer blend composition according to the invention can be formulated according to the following method. First, a pigment dispersion composition, or grind, is formed by: combining an organic solvent, water, a dispersant, a pH adjustor, a surfactant, a defoamer, a colorant/pigment, and a biocide/preservative; stirring and optionally grinding for a period of time to sufficiently mix the ingredients; and, while continuing to stir and/or grind, adding more water. To this pigment dispersion composition can be added the first polymer and the second polymer of the polymer blend according to the invention, followed by a pH adjustor, if desired, and a performance additive composition comprising an organic solvent, a surfactant, and a defoamer. Optionally but preferably, an anticorrosive solution can then be added. Then, a rheology modifier can be added, optionally including more water, if desired, and also a pH adjustor, thus forming a paint composition. Furthermore, if desired, more colorant(s) and/or pigment(s) can be added to the paint composition either to compliment the (white) pigment(s)/colorant(s) already in the pigment dispersion composition or to add another desired color to the paint composition. A coalescing agent may optionally be added later.

EXAMPLES

The following Examples are merely illustrative of certain embodiments of the invention and contain comparisons of compositions and methods according to the invention with the prior art and/or embodiments not according to the invention. The following Examples are not meant to limit the scope and breadth of the present invention, as recited in the appended claims.

Example 1

Low Molecular Weight, Low $T_g$ Polymer w/o Self-Crosslinking Monomer

Example 1 describes a low molecular weight, low glass transition temperature polymer formed without a self-crosslinking monomer present in the constituent monomers. The number average molecular weight of the polymer of Example 1 was found to be about 29,000 Daltons, and the glass transition temperature of the polymer of Example 1 was found to be about −5° C. The latex polymer formulation, in order of addition, is described below in Table 1.

TABLE 1

| Ingredients | Amount (grams) | Monomer content |
|---|---|---|
| Aqueous Surfactant Solution | | |
| deionized water | 845 | |
| RHODACAL DS-4 surfactant | 1 | |
| Total Monomer Emulsion* | | |
| deionized water | 190 | |
| RHODACAL DS-4 surfactant | 40 | |
| RHODAPEX CO-436 surfactant | 10 | |
| SIPOMER WAM-IV monomer | 25 | 3.8 wt % |
| methacrylic acid monomer | 12 | 1.8 wt % |
| methyl methacrylate monomer | 460 | 0.6 wt % |

TABLE 1-continued

| Ingredients | Amount (grams) | Monomer content |
|---|---|---|
| 2-ethylhexyl acrylate monomer | 610 | 93.7 wt % |
| isooctyl 2-mercaptopropionate CTA | 5 | |
| First Initiator Solution | | |
| deionized water | 20 | |
| ammonium persulfate | 2.5 | |
| Second Initiator Solution | | |
| deionized water | 40 | |
| ammonium persulfate | 2.5 | |
| deionized water (rinse) | 10 | |
| Chaser Solutions | | |
| t-butyl hydroperoxide | 1.4 | |
| deionized water | 10 | |
| sodium formaldehyde sulfoxylate | 1 | |
| deionized water | 15 | |
| pH Adjustor | | |
| ammonium hydroxide (26% in $H_2O$) | 5 | |
| deionized water | 10 | |

The glass transition temperature value for the polymer of Example 1 was calculated according to Fox's law. The molecular weight value for the polymer of Example 1 was obtained by analyzing the acrylic latex polymer particles using a GPC method using WATERS 410 with differential Refractomer and tetrahydrofuran as mobile phase at 40° C.

Example 2

Low Molecular Weight, Low $T_g$ Polymer with Self-Crosslinking Monomer

Example 2 describes a first polymer of the polymer blend according to the invention, i.e., a low molecular weight, low glass transition temperature polymer formed with about 0.9 wt % of a self-crosslinking monomer present in the constituent monomers. The molecular weight of the polymer of Example 2 was found to be about 34,000 Daltons (number average; weight average, about 95,000 Daltons; and polydispersity, about 2.8), and the glass transition temperature of the polymer of Example 2 was calculated to be about −5° C. The latex polymer formulation, in order of addition, is described below in Table 2.

TABLE 2

| Ingredients | Amount (grams) | Monomer content |
|---|---|---|
| Aqueous Surfactant Solution | | |
| deionized water | 845 | |
| RHODACAL DS-4 surfactant | 1 | |
| Total Monomer Emulsion* | | |
| deionized water | 190 | |
| RHODACAL DS-4 surfactant | 40 | |
| RHODAPEX CO-436 surfactant | 10 | |
| SIPOMER WAM QM1458 monomer | 25 | 2.2 wt % |
| methacrylic acid monomer | 12 | 1.1 wt % |
| methyl methacrylate monomer | 460 | 41.2 wt % |
| 2-ethylhexyl acrylate monomer | 610 | 54.6 wt % |
| isooctyl 2-mercaptopropionate CTA | 5 | |
| vinyltriethoxysilane monomer | 10 | 0.9 wt % |

TABLE 2-continued

| Ingredients | Amount (grams) | Monomer content |
|---|---|---|
| First Initiator Solution | | |
| deionized water | 20 | |
| ammonium persulfate | 2.5 | |
| Second Initiator Solution | | |
| deionized water | 40 | |
| ammonium persulfate | 2.5 | |
| deionized water (rinse) | 10 | |
| Chaser Solutions | | |
| t-butyl hydroperoxide | 1.4 | |
| deionized water | 10 | |
| sodium formaldehyde sulfoxylate | 1 | |
| deionized water | 15 | |
| pH Adjustor | | |
| ammonium hydroxide (26% in $H_2O$) | 5 | |
| deionized water | 10 | |

The glass transition temperature value for the polymer of Example 2 was calculated according to Fox's law. The molecular weight value for the polymer of Example 2 was obtained by analyzing the acrylic latex polymer particles using the same GPC method as in Example 1.

Example 3

Low Molecular Weight, Low $T_g$ Polymer With Self-Crosslinking Monomer

Example 3 describes a first polymer of the polymer blend according to the invention, i.e., a low molecular weight, low glass transition temperature polymer formed with about 1.8 wt % of a self-crosslinking monomer present in the constituent monomers. The number average molecular weight of the polymer of Example 3 was found to be about 19,000 Daltons, and the glass transition temperature of the polymer of Example 3 was calculated to be about −5° C. The latex polymer formulation, in order of addition, is described below in Table 3.

TABLE 3

| Ingredients | Amount (grams) | Monomer content |
|---|---|---|
| Aqueous Surfactant Solution | | |
| deionized water | 845 | |
| RHODACAL DS-4 surfactant | 1 | |
| Total Monomer Emulsion* | | |
| deionized water | 190 | |
| RHODACAL DS-4 surfactant | 40 | |
| RHODAPEX CO-436 surfactant | 10 | |
| SIPOMER WAM QM1458 monomer | 25 | 2.2 wt % |
| methacrylic acid monomer | 12 | 1.1 wt % |
| methyl methacrylate monomer | 460 | 40.8 wt % |
| 2-ethylhexyl acrylate monomer | 610 | 54.1 wt % |
| isooctyl 2-mercaptopropionate CTA | 10 | |
| vinyltriethoxysilane monomer | 20 | 1.8 wt % |
| First Initiator Solution | | |
| deionized water | 20 | |
| ammonium persulfate | 2.5 | |

TABLE 3-continued

| Ingredients | Amount (grams) | Monomer content |
|---|---|---|
| Second Initiator Solution | | |
| deionized water | 40 | |
| ammonium persulfate | 2.5 | |
| deionized water (rinse) | 10 | |
| Chaser Solutions | | |
| t-butyl hydroperoxide | 1.4 | |
| deionized water | 10 | |
| sodium formaldehyde sulfoxylate | 1 | |
| deionized water | 15 | |
| pH Adjustor | | |
| ammonium hydroxide (26% in H₂O) | 5 | |
| deionized water | 10 | |

The glass transition temperature value for the polymer of Example 3 was calculated according to Fox's law. The molecular weight value for the polymer of Example 3 was obtained by analyzing the acrylic latex polymer particles using the GPC method described in Example 1.

Examples 4-6

Paint Compositions Containing High Molecular Weight, High $T_g$ Polymers

Examples 4-6 describe paint compositions each comprising a single, relatively high molecular weight, relatively high glass transition temperature polymer. The paint composition formulations, in order of addition, are described below in Table 4.

TABLE 4

| Ingredients | Example 4 Amount (grams) | Example 5 Amount (grams) | Example 6 Amount (grams) |
|---|---|---|---|
| Grind Composition | | | |
| water | 133 | 133 | 90 |
| TAMOL 731A dispersant | 15 | 15 | 15 |
| Zinc oxide pigment | 23 | 23 | 23 |
| TRONOX CR-826 pigment | 292 | 292 | 292 |
| Kaolin pigment | 50 | 50 | — |
| Pigment(s)/colorant(s), if desired | | | |
| DREWPLUS L475 defoamer | 0.7 | 0.7 | 0.7 |
| TRITON X-100 surfactant | 20 | 20 | 10 |
| SKANE M-8 microbiocide | 1.9 | 1.9 | 1.9 |
| NUOSEPT 95 microbiocide | 0.9 | 0.9 | 1 |
| DREWPLUS L475 defoamer | 0.5 | 0.5 | 0.5 |
| RHOPLEX SG-10M* polymer | 550 | — | — |
| RHOPLEX MV-23# polymer | — | 550 | — |
| RHOPLEX VSR-50ˣ polymer | — | — | 550 |
| pH Adjuster, if desired | | | |
| Performance Additive Composition | | | |
| TEXANOL coalescent | 20.8 | 14.8 | — |
| OPTIFILM Enhancer400 coalescent | — | — | 15 |
| propylene glycol solvent | 35 | 35 | 35 |
| Anticorrosive Solution, if desired | | | |
| pH Adjuster, if desired | | | |
| Rheology Modifier | | | |
| ACRYSOL RM-2020 NPR | 20 | 20 | 20 |
| ACRYSOL RM-825 | 7.2 | 14.6 | 1.7 |
| water | 34 | 34 | 30 |

TABLE 4-continued

| Ingredients | Example 4 Amount (grams) | Example 5 Amount (grams) | Example 6 Amount (grams) |
|---|---|---|---|
| Stability Additive | | | |
| DREWPLUS L-475 defoamer | 4 | 4 | 4 |
| Other colorant(s), if desired | | | |

*RHOPLEX ™ SG-10M is an acrylic emulsion polymer commercially available from Rohm & Haas.
RHOPLEX ™ MV-23 is an acrylic emulsion polymer commercially available from Rohm & Haas.
ˣRHOPLEX ™ VSR-50 is an acrylic emulsion polymer commercially available from Rohm & Haas.

The polymers used in the paint compositions of Examples 4-6 were analyzed similarly to the polymers of Examples 1-3 and were found to have number average molecular weights of greater than 100,000 Daltons and glass transition temperatures of 25° C., 6° C. and 12° C. based on commercial samples and technical specifications. In addition, the paint compositions of Examples 4-6 exhibited as-formulated viscosities of about 85 KU, about 88 KU, and about 95 KU, respectively. Furthermore, the paint composition of Example 6 has a VOC content of less than about 100 g/L.

Examples 7-9

Paint Compositions According to the Invention Containing a Polymer Blend of a First, Low Molecular Weight, Low $T_g$ Polymer and a Second, High Molecular Weight, High $T_g$ Polymer Examples 7-9 describe paint compositions according to the invention, each comprising a polymer blend of a first, relatively low molecular weight, relatively low glass transition temperature polymer and a second, relatively high molecular weight, relatively high glass transition temperature polymer. The paint composition formulations of all three Examples, in order of addition, are described below in Table 5.

TABLE 5

| Ingredients | Example 7 Amount (grams) | Example 8 Amount (grams) | Example 9 Amount (grams) |
|---|---|---|---|
| Grind Composition | | | |
| water | 133 | 133 | 133 |
| TAMOL 731A dispersant | 15 | 15 | 15 |
| Zinc oxide pigment | 23 | 23 | 23 |
| TRONOX CR-826 pigment | 292 | 292 | 292 |
| Hydrous aluminum silicate pigment | 50 | 50 | — |
| Pigment(s)/colorant(s), if desired | | | |
| DREWPLUS L475 defoamer | 0.7 | 0.7 | 0.7 |
| TRITON X-100 surfactant | 20 | 20 | 20 |
| SKANE M-8 microbiocide | 1.9 | 1.9 | 1.9 |
| NUOSEPT 95 microbiocide | 0.9 | 0.9 | 0.9 |
| DREWPLUS L475 defoamer | 0.5 | 0.5 | 0.5 |
| RHOPLEX SG-10M* polymer | 275 | 275 | — |
| Polymer from Example 1 | 275 | — | — |
| Polymer from Example 2 | — | 275 | 275 |
| RHOPLEX MV-23# polymer | — | — | 275 |
| pH Adjuster, if desired | | | |
| Performance Additive Composition | | | |
| TEXANOL coalescent | 18.8 | 20.8 | 20.8 |
| propylene glycol solvent | 35 | 35 | 35 |
| Anticorrosive Solution, if desired | | | |
| pH Adjuster, if desired | | | |

TABLE 5-continued

| Ingredients | Example 7 Amount (grams) | Example 8 Amount (grams) | Example 9 Amount (grams) |
|---|---|---|---|
| Rheology Modifier | | | |
| ACRYSOL RM-2020 NPR | 20 | 20 | 20 |
| ACRYSOL RM-825 | 10.1 | 9.0 | 10.2 |
| water | 34 | 34 | 34 |
| Stability Additive | | | |
| DREWPLUS L-475 defoamer | 4 | 4 | 4 |
| Other colorant(s), if desired | | | |

*RHOPLEX ™ SG-10M is an acrylic emulsion polymer commercially available from Rohm & Haas.
RHOPLEX ™ MV-23 is an acrylic emulsion polymer commercially available from Rohm & Haas.

The paint compositions of Examples 7-9 exhibited as-formulated viscosities of about 85 KU, about 88 KU, and about 85 KU, respectively.

Examples 10-12

Paint Compositions According to the Invention Containing a Polymer Blend of a First, Low Molecular Weight, Low $T_g$ Polymer and a Second, High Molecular Weight, High $T_g$ Polymer Examples 10-12 describe paint compositions according to the invention, each comprising a polymer blend of a first, relatively low molecular weight, relatively low glass transition temperature polymer containing a self-crosslinking monomer and a second, relatively high molecular weight, relatively high glass transition temperature polymer. The paint composition formulations of all three Examples, in order of addition, are described below in Table 6.

TABLE 6

| Ingredients | Example 10 Amount (grams) | Example 11 Amount (grams) | Example 12 Amount (grams) |
|---|---|---|---|
| Grind Composition | | | |
| water | 133 | 118 | 118 |
| TAMOL 731A dispersant | 15 | 15 | 15 |
| Zinc oxide pigment | 23 | 23 | 23 |
| TRONOX CR-826 pigment | 292 | 292 | 292 |
| Hydrous aluminum silicate pigment | 50 | 50 | — |
| Pigment(s)/colorant(s), if desired | | | |
| DREWPLUS L475 defoamer | 0.7 | 0.7 | 0.7 |
| TRITON X-100 surfactant | 20 | 20 | 20 |
| SKANE M-8 microbiocide | 1.9 | 1.9 | 1.9 |
| NUOSEPT 95 microbiocide | 0.9 | — | — |
| Kathon LX (1.5%) surfactant | — | 1 | 1 |
| DREWPLUS L475 defoamer | 0.5 | 0.5 | 0.5 |
| RHOPLEX ™ VSR-50ˣ polymer | 275 | — | — |
| Polymer from Example 2 | 275 | 385 | — |
| RHOPLEX SG-10M* polymer | — | 165 | 225 |
| Polymer from Example 3 | — | — | 225 |
| pH Adjuster, if desired | | | |
| Performance Additive Composition | | | |
| OPTIFILM Enhancer400 coalescent | 14 | — | — |
| ARCHER RC coalescent | — | 12 | 8 |
| propylene glycol solvent | 35 | 20 | 12 |
| TEXANOL coalescent | — | — | 3 |
| butyl carbitol solvent | — | — | 3 |
| Anticorrosive Solution, if desired | | | |
| pH Adjuster, if desired | | | |

TABLE 6-continued

| Ingredients | Example 10 Amount (grams) | Example 11 Amount (grams) | Example 12 Amount (grams) |
|---|---|---|---|
| Rheology Modifier | | | |
| ACRYSOL RM-2020 NPR | 20 | 25 | 25 |
| ACRYSOL RM-825 | 9.2 | 7 | 9.7 |
| water | 34 | 49 | 49 |
| Stability Additive | | | |
| DREWPLUS L-475 defoamer | 4 | 5 | 5 |
| Other colorant(s), if desired | | | |

ˣRHOPLEX ™ VSR-50 is an acrylic emulsion polymer commercially available from Rohm & Haas.
*RHOPLEX ™ SG-10M is an acrylic emulsion polymer commercially available from Rohm & Haas.

The paint compositions of Examples 10-12 exhibited as-formulated viscosities of about 86 KU, about 86 KU, and about 88 KU, respectively. In addition, the paint composition of Example 10 was a low-VOC composition (i.e., it exhibited a volatile organic compound content of less than 50 g/L, or about 5% w/v), and the paint compositions of Examples 11-12 both exhibited VOC content of about 55 g/L (or about 5.5% w/v) to about 65 g/L (or about 6% w/v). The VOC content was estimated from the formulation, based on EPA Method 24 and the following formula:

VOC content(g/L)=[weight of VOCs(g)]/([total volume in liters]−[water volume in liters])

Viscosity, Gloss, and VOC Content Values

Table 7 below shows the results of these characteristic tests for the paint compositions of Examples 4-12.

TABLE 7

| | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|
| viscosity (KU) | 85 | 88 | 95 | 85 | 88 | 85 | 86 | 86 | 88 |
| ICI viscosity (poise) | 1.2 | 1.4 | 1.4 | 1.2 | 1.2 | 1.2 | 1.1 | 1.2 | 1.3 |
| Gloss (60°) | 36 | 39 | 60 | 35 | 36 | 42 | 38 | 44 | 36 |
| VOC (g/L) | 140 | 138 | 94 | 137 | 140 | 128 | 46 | 58 | 64 |

Chalk Adhesion Testing

Chalk binding tests are typically performed on chalky substrates. Chalky substrates are commercial alkyd paints that have been naturally weathered to achieve an ASTM chalk ratings of about 5. A suitable test method is described in U.S. Pat. No. 6,268,420.

In these cases, chalky substrates are western red cedar panels painted with commercially available alkyd paints and weathered to have ASTM ratings from 5 to 6 using the method described in the '420 patent. Various 3-mil thick draw down coatings of paint compositions were applied to these panels and let dry for about 7 days at ambient conditions. After drying, wet and dry adhesion of the paint coatings were evaluated using Scotch™ 600 tape and a 6×6 cross-hatch adhesion standard test, as detailed in ASTM D3359 Method B. For wet adhesion, the coated panels were placed in a fog box, simulating rain conditions at 100% humidity, for about 4 hours and were dried in air at ambient conditions for about 1 hour prior to the Crosshatch Adhesion test. The percentage peeling (area) and an ASTM rating were tabulated for coatings made from each of the paint compositions of Examples 4-12, as well as Comparative Example 13 (a paint composition containing a blend of an alkyd resin and a high molecular weight, high glass transition temperature polymer, as described herein, which composition is commercially available from Benjamin Moore, Inc., as Benjamin Moore 0961B). Table 8 below shows those results.

TABLE 8

| Sample | Chalk Adhesion (% peeling) | Chalky Substrate ASTM Rating |
|---|---|---|
| Comparative Example 4 | 100% | 6 |
| Comparative Example 5 | 50% | 6 |
| Comparative Example 6 | 40% | 6 |
| Example 7 | 10% | 6 |
| Example 8 | 15% | 6 |
| Example 9 | 10% | 6 |
| Example 10 | 10% | 6 |
| Example 11 | 5% | 5 |
| Example 12 | 0% | 5 |
| Comparative Example 13 | 10% | 5 |

The results in Table 8 show that the polymer blends according to the invention (Examples 7-12) have at least comparable chalk adhesion properties to an alkyd resin-containing polymer blend (Comparative Example 13) and that all the blends exhibited superior chalk adhesion properties to the single polymer coating compositions (Examples 4-6). Further, because the polymer blends of Examples 7-12 contain substantially no alkyd resin, it is believed that they all exhibit yellowing characteristics superior to those of the alkyd resin-containing polymer blend of Comparative Example 13.

Resistance to Surfactant Leaching and Water Softening

Surfactant leaching is a test for probing the extent of exterior water spotting on a coating. The test method for surfactant leaching involved forming 3-mil draw down panels of each coating composition. These panels were then allowed to dry in air at ambient conditions for about 24 hours. Each panel was then held so that the coating on the substrate was oriented vertically, at which point 3-5 drops of water were applied over the coated area. Without changing the orientation of the panels, the coatings were allowed to dry. The presence or absence of visible staining on each panel was noted and rated from 1 to 5, with 1 representing the most visible stain, and with 5 representing no visible stain.

The exterior water sensitivity, or water softening, testing method involved forming 3-mil draw down panels of each coating composition. These panels were then allowed to dry in air at ambient conditions for about 24 hours. Each panel was then held so that the coating on the substrate was oriented horizontally, at which point approximately 3 drops of water were applied over the coated area and allowed to "soak" for about 2 minutes. The panels were then carefully blotted dry and scratched with a fingernail to test for any softening of the coatings, which were noted as ratings from 1 to 5, with 1 representing the worst softening of the coatings upon exposure to the water, and with 5 representing no observable softening upon exposure to the water.

Table 9 below shows the results of both tests on coatings made from the paint compositions of Examples 4-5 and 7-9. The results indicate that the paint compositions containing polymer blends according to the invention in which the first polymer contains an amount of self-crosslinking monomer (Examples 8-9) exhibited improved resistance to both surface leaching and water softening.

TABLE 9

| | Example 4 | Example 5 | Example 7 | Example 8 | Example 9 |
|---|---|---|---|---|---|
| Surfact. Leach. Rating | 3 | 3 | 3 | 4 | 5 |
| Water Resist. Rating | 3 | 3 | 3 | 4 | 4 |

Low temperature coalescence testing is designed to probe the ability of a coating composition to form a uniform and smooth coating on a substrate. The test method for low temperature coalescence involved first cooling a number of 6"×6" upson panels to about 35° F. for about 1 hour. Each panel is then coated with draw downs of each composition having a thickness starting at 8 mils and going to 28 mils. These panels were then kept about 35° F. in a refrigerator for about 24 hours, and were allowed to recover for about 1 hour at room temperature. The presence or absence of visible cracks on each panel was noted and rated from 8 to 28+, based on the thinnest panel on which cracks were first evident, with each number represent its mil-thickness, and with 28+ representing that none of the panels showed cracks.

Table 10 below shows the results of the low temperature coalescence testing for coatings made from the paint compositions of Examples 4, 6-8, 10, and 12.

TABLE 10

| | Example 4 | Example 6 | Example 7 | Example 8 | Example 10 | Example 12 |
|---|---|---|---|---|---|---|
| LTC Rating | 10 | 8 | 28+ | 28+ | 28+ | 28+ |

Samples of the inventive polymer blend and paints/coatings made with such inventive samples were also compared with conventional paints made with conventional polymer blends described in the Gebhart reference (US 2004/0010071 or U.S. Pat. No. 6,930,141) discussed above.

The latex polymer blend disclosed in the Gebhart prior reference is dominated by soft or low Tg polymer particles (70%-99.7%) and has only a minor amount of hard or high Tg polymer particles. (See Abstract). The weight average molecular weight (Mw) of the soft polymer ranges from 75,000 to 2,000,000. Hence, the polymer blend is dominated by the higher Mw soft polymer. Since this molecular weight is high, the latex composition disclosed in Gebhart has poor adhesion to chalky substrate typically found outdoors. The inventors of the present invention repeated "Example 1" of Gebhart, which is discussed below as comparative example A.

The following polymer samples with low Tg were prepared. Polymer sample A was prepared in accordance to "Example 1" and the redox polymerization technique discussed in the Gebhart reference. This redox technique described in Gebhart, see e.g., paragraph [0020], requires that during the redox polymerization at least 40% weight is polymerized in the presence of 5% weight of added monomer that remains unreacted. Polymer sample B was prepared in accordance to the present invention with the low Tg polymer having a relatively low number average molecular weight Mn and a relatively low PDI. Comparative polymer sample C was prepared with a conventional method, which is similar to the method used to produce inventive polymer sample B, except that no molecular weight control agent or chain transfer agent was used. However, the Mw of comparative polymer sample C could not be determined, since its latex particles are not completely soluble in tetrahydrofuran (THF) aprotic solvent.

The inventors of the present invention also attempted to produce a soft polymer with a Mw at or near the low end of the Mw range (75,000 to 2,000,000) disclosed in Gebhart. It is important to note that the present inventors could not produce a latex composition with Mw at or near 75,000 using the receipt and redox polymerization technique described in Gebhart, despite their best efforts. Comparative polymer sample D was prepared similarly to inventive polymer sample B. A summary of the polymer samples' molecular weights are listed as follows:

TABLE 11

| Sample | Mw | Mn | PDI | Tg (° C.) | |
|---|---|---|---|---|---|
| Comparative A | 280,000 | 46,500 | 6.0 | −10° C. | Gebhart Ex. 1 of US 2004/0010071 |
| Inventive B | 49,000 | 19,600 | 2.5 | −5° C. | Inventive |
| Comparative C | N/A | | | −5° C. | Mw is probably between 200,000 and 1,000,000 |
| Comparative D | 76,000 | 13,438 | 5.67 | −5° C. | Mw is at the lower end of the Mw range disclosed in Gebhart |

The formulations for Polymer Samples B-D are as follows:

TABLE 12

| Ingredients | Inventive Polymer Sample B | Comparative Polymer Sample C | Comparative Polymer Sample D |
|---|---|---|---|
| Aqueous Surfactant Solution | | | |
| deionized water | 845 g | 845 g | 845 g |
| RHODACAL DS-4 surfactant | 1 | 1 | 1 |

TABLE 12-continued

| Ingredients | Inventive Polymer Sample B | Comparative Polymer Sample C | Comparative Polymer Sample D |
|---|---|---|---|
| Total Monomer Emulsion | | | |
| deionized water | 190 | 190 | 190 |
| RHODACAL DS-4 surfactant | 40 | 40 | 40 |
| RHODAPEX CO-436 surfactant | 10 | 10 | 10 |
| SIPOMER WAM-IV monomer | 25 | 25 | 25 |
| methacrylic acid monomer | 12 | 12 | 12 |
| methyl methacrylate monomer | 460 | 460 | 460 |
| 2-ethylhexyl acrylate monomer | 610 | 610 | 610 |
| Silquest A-151 | 20 | 20 | 20 |
| isooctyl 2-mercaptopropionate CTA | 10 | 0 | 5 |
| First Initiator Solution | | | |
| deionized water | 20 | 20 | 20 |
| ammonium persulfate | 2.5 | 2.5 | 2.5 |
| Second Initiator Solution | | | |
| deionized water | 40 | 40 | 40 |
| ammonium persulfate | 2.5 | 2.5 | 2.5 |
| deionized water (rinse) | 10 | 10 | 10 |
| Chaser Solutions | | | |
| t-butyl hydroperoxide | 1.4 | 1.4 | 1.4 |
| deionized water | 10 | 10 | 10 |
| sodium formaldehyde sulfoxylate | 1 | 1 | 1 |
| deionized water | 15 | 15 | 15 |
| pH Adjustor | | | |
| ammonium hydroxide (26% in $H_2O$) | 5 | 5 | 5 |
| deionized water | 10 | 10 | 10 |

Paint formulations A-D are prepared with a blend of low Tg/soft polymer samples A-D, respectfully, and a high Tg/hard polymer. All paints are tinted with 4 grams of a yellow pigment concentrate, Colanyl Yellow 2GXD from Clariant. Paint formulations A-D are as follows:

TABLE 13

| Ingredients | Comparative Paint A (grams) | Inventive Paint B (grams) | Comparative Paint C (grams) | Comparative Paint D (grams) |
|---|---|---|---|---|
| Grind Composition | | | | |
| water | 61.0 | 61.0 | 61.0 | 61.0 |
| TAMOL 731A dispersant | 6.9 | 6.9 | 6.9 | 6.9 |
| Zinc oxide pigment | 10.6 | 10.6 | 10.6 | 10.6 |
| TRONOX CR-826 pigment | 134 | 134 | 134 | 134 |
| Hydrous aluminum silicate pigment | 22.9 | 22.9 | 22.9 | 22.9 |
| DREWPLUS L475 defoamer | 0.2 | 0.2 | 0.2 | 0.2 |
| Check Grind | | | | |
| SKANE M-8 microbiocide | 0.9 | 0.9 | 0.9 | 0.9 |
| Acrylsol RM-825 | 3.9 | 3.9 | 3.9 | 3.9 |
| NUOSEPT 95 microbiocide | 0.4 | 0.4 | 0.4 | 0.4 |
| Texanol Eastman | 8.6 | 8.6 | 8.6 | 8.6 |
| Propylene glycol | 16.1 | 16.1 | 16.1 | 16.1 |
| RHOPLEX SG-10M hard polymer | 126 | 126 | 126 | 126 |
| Polymer Sample A | 126 | — | — | — |
| Polymer Sample B | — | 126 | — | — |
| Polymer Sample C | — | — | 126 | — |
| Polymer Sample D | — | — | — | 126 |
| pH Adjuster, if desired to 8.5-9.0 | | | | |

TABLE 13-continued

| Ingredients | Comparative Paint A (grams) | Inventive Paint B (grams) | Comparative Paint C (grams) | Comparative Paint D (grams) |
|---|---|---|---|---|
| Rheology Modifier | | | | |
| ACRYSOL RM-2020 NPR | 9.2 | 9.2 | 9.2 | 9.2 |
| ACRYSOL RM-825 | 0.7 | 0.7 | 0.7 | 0.7 |
| water | 4.6 | 4.6 | 4.6 | 4.6 |
| Stability Additive | | | | |
| DREWPLUS L-475 defoamer | 1.8 | 1.8 | 1.8 | 1.8 |

Paint samples A-D were prepared with a blend of polymer samples A-D, respectively, as the low Tg polymer and a Rhoplex SG-10M with a Tg of about 28° C., as the high Tg polymer. All paint samples were prepared with a 1:1 ratio of low Tg/soft polymer to high Tg/hard polymer. This ratio was also used in paint sample A, which includes the low Tg polymer made in accordance with the Gebhart reference. This 1:1 ratio is a diversion from the teaching of Gebhart. Gebhart discloses in paragraph 0046 that the low Tg/soft, high Mw polymer should make up about 70%-98% of the latex and the high Tg/hard, low Mw polymer should make up a much smaller portion 2%-30% of the latex. The paint/latex formulations disclosed in Gebhart were designed for indoor applications to balance scrubability of the low Tg/soft polymer and the blocking resistance from the high Tg/hard polymer. (See Abstract and paragraphs [0096]-[0099] of Gebhart). The range of ratios described in Gebhart would most certainly fail when used to cover a chalky substrate, i.e., outdoor applications, because while the low Tg/soft polymer should go below the chalky substrate to increase adhesion to the substrate, there should be a sufficient amount of high Tg/hard polymer to ensure the mechanical strength of the coating. To render the experimental results and comparison more meaningful, the present inventors decreased the amount of low Tg polymer and increased the amount of high Tg polymer of the polymer blend disclosed in Gebhart.

Chalk Adhesion Test

Chalky substrates are commercial alkyd paints applied on wood that have been naturally weathered to achieve an ASTM chalk ratings of about 5. 3-mil thick draw down coatings of paint compositions A-D were applied to these panels and let dry for about 7 days at ambient conditions. For wet adhesion, the coated panels were placed in a fog box, simulating rain conditions at 100% humidity, for about 4 hours and were dried in air at ambient conditions for about 30 min prior to the Crosshatch Adhesion test. The adhesion of the paint coatings were evaluated using Scotch™ 600 tape and a 6×6 crosshatch adhesion standard test, as detailed in ASTM D3359 Method B.

The results of wet chalk adhesion are shown in Table 14. Photographs of the test samples are shown in FIG. 1. The percentage peel is area of peeling over total area tested. 100% peel is complete removal all paint from chalky surface, indicating poor adhesion.

TABLE 14

Chalk Adhesion Results

| Paints | % Peel | |
|---|---|---|
| B vs A | B: 0% | A: 100% |
| B vs. C | B: 0% | C: 100% |
| B vs. D | B: 0% | D: 80% |

Comparative paint A made with the comparative soft polymer A pursuant to Gebhart and Comparative paint C made with high Mw, soft polymer in the blend have zero chalk adhesion or 100% peel. Comparative paint D with Mw of about 76,000 (Mn of about 13,438 and PDI of about 5.67) has poor chalk adhesion or about 80% peel. Inventive paint B with Mw of about 49,000 (Mn of about 19,600 and PDI of about 2.5) has excellent chalk adhesion or 0% peel. This shows that unexpectedly paint with lower Mn and low PDI (or low Mw) soft polymer in the blend at the ratio of the present invention, inter alia, has improved chalk adhesion over paints with other polymer blends.

"Example 1" in the Gebhart reference does produce soft polymer with Mw of 280,000 and a measured Mn of 46,500. However, when this soft polymer is blended with a hard polymer at a ratio and molecular weight borrowed from the present invention to produce paints, the paints failed the chalk adhesion test. Without being bound to any particular theory, Applicants believe the failure is due to the fact that its polydispersity index, PDI, at about 6 is too high. As discussed above, high PDI indicates that the distribution of the species of polymers about the average molecular average is wide. In other words, there are too many individual polymers with high molecular weight mixed in with individual polymers with low molecular weights. The individual polymers with high molecular weight do not contribute to adhesion to chalky substrate. Contrariwise, in accordance with the present invention, the PDI should be less than about 4.5, which indicates a more uniform distribution of low molecular weight polymers, which is beneficial to adhesion to chalky substrate.

One way of expressing the present invention is by using the number weight molecular weight (Mn) with a PDI, discussed above. Another way of expressing the present invention is by using weight average molecular weight (Mw) with or without a PDI. As discussed above, Mw measurements are less sensitive to low molecular weight polymers. Since the soft polymers of the present invention has a Mw of less than about 70,000 Daltons, at this range Mw may be accurately expressed without PDI.

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. A latex composition comprising a polymer blend of a first polymer and a second polymer, wherein:
    the first polymer is made from first constituent monomers, has a number average molecular weight greater than about 7,000 Daltons and less than about 40,000 Daltons and a polydispersity index of less than about 4.5, has a glass transition temperature from about −20° C. to about 60° C., and comprises a self-crosslinking monomer;
    the second polymer is made from second constituent monomers, has a number average molecular weight greater than about 80,000 Daltons, and has a glass transition temperature from about −20° C. to about 60° C.;
    the glass transition temperature of the second polymer is at least about 10° C. higher than the glass transition temperature of the first polymer; and
    the relative proportion of the first polymer to the second polymer is from about 1:4 to 4:3 by weight.

2. The latex composition of claim 1, wherein the self-crosslinking monomer comprises an acetoacetoxyalkyl acrylate, an acetoacetoxyalkyl alkacrylate, a dialkoxyalkyl vinyl silane, a trialkoxy vinyl silane, or a combination thereof.

3. The latex composition of claim 2, wherein the amount of the self-crosslinking monomer is from about 0.1% to about 5% by weight of the constituent monomers of the first polymer, and wherein the self-crosslinking monomer is a trialkoxy vinyl silane.

4. The latex composition of claim 1, wherein the relative proportion of first polymer to second polymer is from about 1:3 to about 5:4 by weight.

5. The latex composition of claim 4, wherein the relative proportion of first polymer to second polymer is from about 3:7 to about 1:1 by weight.

6. The latex composition of claim 1, wherein the glass transition temperature of the first polymer is from about −5° C. to about 20° C., and wherein the glass transition temperature of the second polymer is from about 5° C. to about 25° C.

7. The latex composition of claim 1, wherein the number average molecular weight of the first polymer is less than about 35,000 Daltons.

8. The latex composition of claim 1, wherein the number average molecular weight of the first polymer is less than about 30,000 Daltons.

9. The latex composition of claim 1, wherein the number average molecular weight of the first polymer is less than about 25,000 Daltons.

10. The latex composition of claim 1, wherein the number average molecular weight of the first polymer is less than about 20,000 Daltons.

11. The latex composition of claim 1, wherein the number average molecular weight of the first polymer is greater than about 10,000 Daltons and less than about 40,000 Daltons.

12. The latex composition of claim 1, wherein the polydispersity index is less than about 4.0.

13. The latex composition of claim 1, wherein the polydispersity index is less than about 3.5.

14. The latex composition of claim 1, wherein the polydispersity index is less than about 3.0.

15. The latex composition of claim 1, wherein the number average molecular weight of the second polymer is from about 80,000 Daltons to about 1,000,000 Daltons, or the weight average molecular weight of the second polymer is from about 200,000 to 2,000,000 Daltons.

16. The latex composition of claim 1, wherein the number average molecular weight of the second polymer is from about 100,000 to about 500,000, or the weight average molecular weight is from 300,000 to 1,000,000 Daltons.

17. The latex composition of claim 1, wherein the glass transition temperature of the second polymer is at least about 15° C. higher than the glass transition temperature of the first polymer.

18. The latex composition of claim 17, wherein the glass transition temperature of the second polymer is at least about 20° C. higher than the glass transition temperature of the first polymer.

19. The latex composition of claim 1, wherein the constituent monomers of the first polymer are substantially acrylic or the constituent monomers of the second polymer are substantially acrylic.

20. The latex composition of claim 1, wherein the polymer blend is substantially free from sequentially polymerized polymers.

21. A coated substrate wherein a coating made with the latex composition of claim 1 exhibits less than about 25% peeling from the crosshatch adhesion test under ASTM D3359 Method B.

22. A latex composition comprising a polymer blend of a first polymer and a second polymer, wherein:
    the first polymer is made from first constituent monomers, has a number average molecular weight greater than about 7,000 Daltons and less than about 40,000 Daltons and a polydispersity index of less than about 4.5, has a glass transition temperature from about −20° C. to about 60° C., and comprises a self-crosslinking monomer;
    the second polymer is made from second constituent monomers, has a number average molecular weight greater than about 100,000 Daltons, and has a glass transition temperature from about −20° C. to about 60° C.;
    the glass transition temperature of the second polymer is at least 10° C. higher than the glass transition temperature of the first polymer;
    the polymer blend is substantially free from sequentially polymerized polymers; and
    the first constituent monomers, the second constituent monomers, or both, are substantially free from phosphorus-containing pendant groups, from polyacid-containing pendant groups, or from both.

23. A latex composition comprising a polymer blend of a first polymer and a second polymer, wherein:
    the first polymer is made from first constituent monomers, has a number average molecular weight greater than about 7,000 Daltons and a weight average molecular weight less than about 70,000 Daltons, and a polydispersity index of less than 4.5 has a glass transition temperature from about −20° C. to about 60° C., and comprises a self-crosslinking monomer;

the second polymer is made from second constituent monomers, has a weight average molecular weight greater than about 250,000 Daltons, and has a glass transition temperature from about −20° C. to about 60° C.;

the glass transition temperature of the second polymer is at least about 10° C. higher than the glass transition temperature of the first polymer; and the relative proportion of the first polymer to the second polymer is from about 1:4 to 4:3 by weight.

24. The latex composition of claim 23, wherein the self-crosslinking monomer comprises an acetoacetoxyalkyl acrylate, an acetoacetoxyalkyl alkacrylate, a dialkoxyalkyl vinyl silane, a trialkoxy vinyl silane, or a combination thereof.

25. The latex composition of claim 23, wherein the amount of the self-crosslinking monomer is from about 0.1% to about 5% by weight of the constituent monomers of the first polymer, and wherein the self-crosslinking monomer is a trialkoxy vinyl silane.

26. The latex composition of claim 23, wherein the polydispersity index is less than about 3.5.

27. The latex composition of claim 23, wherein the polydispersity index is less than about 3.0.

28. The latex composition of claim 23, wherein the weight average molecular weight of the first polymer is less than about 65,000 Daltons.

29. The latex composition of claim 23, wherein the weight average molecular weight of the first polymer is less than about 60,000 Daltons.

30. The latex composition of claim 23, wherein the weight average molecular weight of the first polymer is less than about 50,000 Daltons.

31. The latex composition of claim 23, wherein the weight average molecular weight of the first polymer is less than about 40,000 Daltons.

32. The latex composition of claim 23, wherein the weight average molecular weight of the first polymer is less than about 30,000 Daltons.

33. The latex composition of claim 23, wherein the weight average molecular weight of the second polymer is greater than about 200,000 Daltons.

34. The latex composition of claim 23, wherein the glass transition temperature of the second polymer is at least about 15° C. higher than the glass transition temperature of the first polymer.

35. The latex composition of claim 34, wherein the glass transition temperature of the second polymer is at least about 20° C. higher than the glass transition temperature of the first polymer.

* * * * *